United States Patent [19]

Schrader

[11] 4,166,678
[45] Sep. 4, 1979

[54] LIGHT SHIELD FOR PHOTOMETER-EQUIPPED CAMERA

[75] Inventor: Goetz Schrader, Frankfurt am Main, Fed. Rep. of Germany

[73] Assignee: Plaubel, Feinmechanik & Optik GmbH, Frankfurt am Main, Fed. Rep. of Germany

[21] Appl. No.: 831,280

[22] Filed: Sep. 7, 1977

[30] Foreign Application Priority Data

Sep. 8, 1976 [DE] Fed. Rep. of Germany ....... 2640370

[51] Int. Cl.² .......................... G03B 7/08; G03B 11/04
[52] U.S. Cl. .................................... 354/23 R; 350/58; 354/59; 354/295
[58] Field of Search ................. 354/22, 23 R, 59, 295, 354/286–288; 350/58, 59

[56] References Cited

U.S. PATENT DOCUMENTS

| 3,759,153 | 9/1973 | Aimo et al. ................. 354/23 R |
| 3,898,678 | 8/1975 | Walworth ..................... 354/22 X |

*Primary Examiner*—John Gonzales
*Attorney, Agent, or Firm*—Montague & Ross

[57] ABSTRACT

The front of a camera lens mount, provided with a photocell window adjacent the objective, can be fitted with a light shield closely surrounding the cone of incident light rays and cutting across the photocell axis. To insure proper illumination of the photocell, a light conductor extends alongside the light shield from the vicinity of the photocell window to about the plane of the inlet end of the light shield.

5 Claims, 2 Drawing Figures

PRIOR ART

LIGHT SHIELD FOR PHOTOMETER-EQUIPPED CAMERA

FIELD OF THE INVENTION

My present invention relates to a light shield for a photographic camera whose front lens carries a photocell or electric eye of a photometer alongside its objective.

BACKGROUND OF THE INVENTION

When a picture is to be taken against the sun or some other strong light source, tubular light shields of cylindrical or frustoconical shape are frequently used to prevent the direct incidence of rays from that source upon the front lens of the objective. The rim of such a light shield should come as close as possible to the boundary of the field of view of the objective without, of course, cutting off any useful light rays from the object to be photographed.

A photometric cell, serving either to indicate the degree of illumination to the user or to control directly the diaphragm stop, is generally positioned behind a window lying adjacent the objective at the front end of a lens mount. A tube designed to provide maximum protection against incident sunlight would therefore cut across the path of light rays passing from the object to the photocell unless the end of that tube proximal to the lens mount is large enough to encompass both the objective and the photocell window. A tube of such large base diameter, however, must also be of considerable axial height in order to approach the boundary of the field of view at its distal end. Such a light shield is relatively heavy and unwieldy.

OBJECT OF THE INVENTION

The object of my present invention, therefore, is to provide an improved light shield which is easy to handle and of compact structure while satisfying the requirement of maximum protection against direct illumination for a camera equipped with a photocell next to its objective.

SUMMARY OF THE INVENTION

I realize this object, pursuant to the present invention, by providing a light shield in the form of a generally frustoconical tube of opaque material centered on the optical axis of the camera objective upon being operatively positioned on the lens mount, with the narrower end of the tube closely surrounding the objective and with its wider end extending into the path of axially incident light rays trained upon the photocell window. For proper illumination of the photocell in the presence of this tube, the latter is externally provided with light-guiding means having an entrance aperture laterally offset from the wider tube end and an exit aperture closely confronting the photocell window.

The external light-guiding means may comprise an internally reflecting conductor of the fiber-optical kind advantageously extending over the full axial height of the tube.

BRIEF DESCRIPTION OF THE DRAWING

The above and other features of my invention will now be described in detail with reference to the accompanying drawing in which.

SPECIFIC DESCRIPTION

Figure 1:
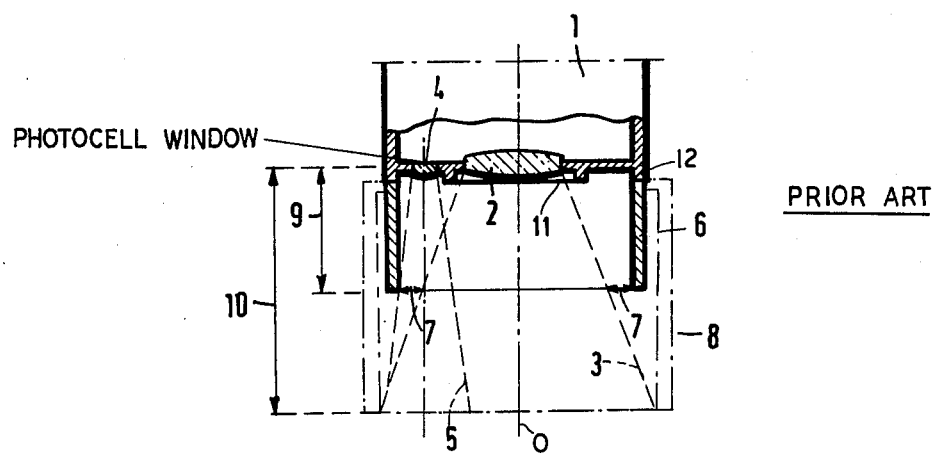
FIG. 1 is an axial sectional view of the front end of a camera equipped with a photocell and temporarily fitted with a conventional light shield.

In FIG. 1 I have shown at 1 the front end of a lens holder of a camera having an objective, centered on an optical axis 0, of which only the front lens 2 has been illustrated. The lens 2 is surrounded by a collar 11 accommodating the usual shutter mechanism not shown. An outer annular flange 12 coaxial with lens 2 surrounds the front face of the lens holder which has an eccentric window 4 in line with a photocell, also not shown. Window 4 may be in the form of a collective lens, as indicated.

The objective symbolized by lens 2 has a frustoconical field of view 3 intersecting the more slender field of view 5 of the photocell aligned with window 4. A light shield 6 in the form of a cylindrical tube, designed to leave unobstructed the two fields of view, can be fitted onto the flange 12 so as to surround both the central front lens 2 and the eccentric window 4. The outer end of this tube is separated from the boundary of field 3 by an annular space 7 through which undesirable light rays can strike the lens 2.

Alternatively, as shown in phantom lines, a longer and somewhat wider tube 8 can be fitted onto the lens holder 1 in such a way that its outer rim just touches the boundaries of both fields 3 and 5. While such an enlarged tube 8 affords maximum protection against incident sunlight, its axial height 10 is about twice the height 9 of tube 6.

Figure 2:
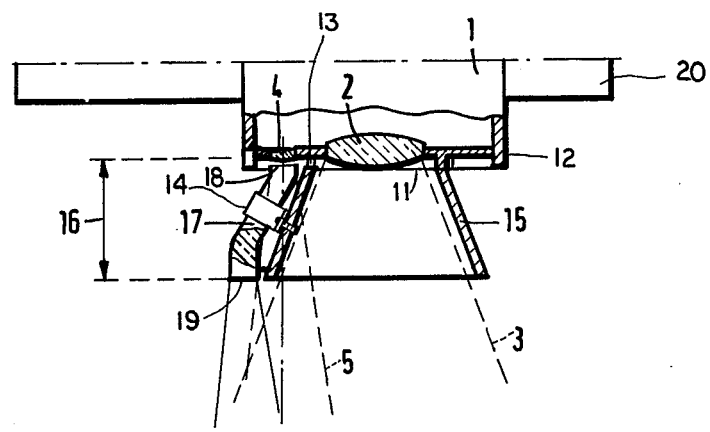
FIG. 2 is a view similar to FIG. 1, showing the camera fitted with a light shield embodying my invention.

FIG. 2 illustrates my improved light shield which comprises a frustoconical tube 15 mounted on the collar 11 of lens mount 1 so that its narrower base coaxially surrounds the objective lens 2 with photocell window 4 located on the outside of that tube. The generatrices of tube 15 closely parallel the limiting rays of field 3, yet a part of the tube cuts across the field of view 5 of photocell window 4. However, adequate illumination of that window is insured by a fiber-optical conductor 17 secured to the outer surface of tube 15 by suitable fastening means such as a clamp 14. With a pin 13 of tube 15 inserted into a corresponding bore of collar 11, conductor 17 is so oriented with reference to lens mount 1 that its exit aperture 18 closely confronts the window 4; its entrance aperture 19 is substantially coplanar with the wider end of tube 15 whose axial height 16 is about equal to the height 9 of the conventional light shield 6 (FIG. 1). Conductor 17 may consist of glass or of a suitably refractive synthetic resin such as a polyacrylate (Plexiglas).

Lens mount 1 may be attached directly to an associated camera housing 20 but could also be connected therewith through a bellows and an articulated linkage allowing the axial distance of the objective from a film plane in the housing to be varied for focusing purposes, e.g. as described in my copending applications Ser. Nos. 831,279 and 831,265 of even date.

I claim:

1. A light shield attachable to the front of a camera lens mount provided with a photocell window adjacent an objective, comprising:

a generally frustoconical tube centered on the optical axis of said objective when operatively positioned on said lens mount, with its narrower end closely surrounding said objective and with its wider end extending into the path of axially incident light rays trained upon said window; and light-guiding means externally of said tube with an entrance aperture laterally offset from said wider end and with an exit aperture closely confronting said window.

2. A light shield as defined in claim 1 wherein said light-guiding means comprises an internally reflecting solid optical conductor.

3. A light shield as defined in claim 2 wherein said conductor extends over substantially the axial height of said tube.

4. A light shield as defined in claim 3 wherein said entrance aperture is substantially coplanar with said wider end.

5. A light shield as defined in claim 1 wherein the generatrices of said tube in its operative position substantially parallel the limiting rays of the field of view of said objective.

* * * * *